Patented Apr. 3, 1951

2,546,958

UNITED STATES PATENT OFFICE 2,546,958

GAMMA ACETOXY-GAMMA,GAMMA DICARBALKOXY-BUTYRALDEHYDES AND PROCESS

Donald T. Warner and Owen A. Moe, Minneapolis, Minn., assignors to General Mills, Inc., a corporation of Delaware No Drawing. Application April 7, 1948, Serial No. 19,652

8 Claims. (Cl. 260—483)

The present invention relates to gamma acetoxy-gamma,gamma dicarbalkoxy-butyraldehydes and process and other related compounds. The compounds of the present invention have the following formula:

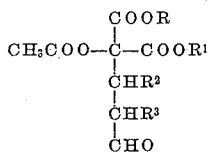

in which R, R¹¹, R², and R³ may be hydrogen or a low aliphatic group. Compounds of this type are of extreme value in view of their high functional nature and the wide variety of reactions into which they enter, thus making them extremely useful in organic syntheses.

It is, therefore, an object of the present invention to provide novel gamma-acetoxybutyraldehydes of the above type.

It is a further object of the present invention to provide a novel process of producing such aldehydes.

These compounds may be made by the 1,4 addition of alpha,beta-unsaturated aldehydes to acetoxymalonic esters. Preferably the malonic esters are the ethyl esters in view of their ready availability. Other aliphatic esters, such as methyl, propyl, butyl, and the like, may also be used. Acrolein is the preferred unsaturated aldehyde in view of its ready availability. However, other unsaturated aldehydes, such as methacrolein and crotonaldehyde, may also be used. These variations make possible the variations in the various R groups referred to above.

The reaction between acrolein and ethyl acetoxymalonate is as follows:

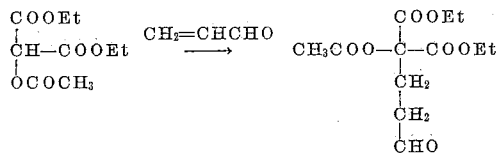

This reaction may be carried out in the presence of a suitable solvent such as ethanol, benzene, toluene, and in the presence of an alkaline catalyst such as a catalytic amount of sodium ethoxide, sodium methoxide, tributyl amine and the like. Usually it is desirable to employ the catalyst in a molar concentration of 0.005 to 0.02 mole per mole of reactant. It is possible however to operate somewhat outside these limits. The reaction proceeds smoothly at temperatures ranging from 0–60° C., and the resultant aldehydo compound may be isolated and characterized by converting it to the phenylhydrazone in accordance with known procedures.

The following example serves to illustrate the invention.

EXAMPLE

*Synthesis of gamma-acetoxy-gamma,gamma-dicarbethoxybutyraldehyde*

Twenty-one and eight-tenths grams (21.8 g.) of ethyl acetoxymalonate (Dimroth and Schweizer, Ber. 56, 1375 (1932)), was added to an alcoholic solution containing 54 cc. of absolute ethanol and 0.04 g. of sodium. The slightly yellow solution was cooled to 2° C. and 5.9 g. of acrolein was added dropwise. The reaction temperature increased rapidly to 9° C., and was then maintained at 8° C. by controlling the rate of addition of the alpha,beta-unsaturated aldehyde. The reaction mixture was allowed to stand for four hours after the addition of the acrolein to complete the reaction and produce the desired aldehyde, after which 0.6 cc. of glacial acetic acid was added to neutralize the catalyst. The reaction mixture was then concentrated in vacuo to a total volume of approximately 50 cc. The resulting concentrate was filtered and a portion of the filtrate was treated with 2,4-dinitrophenylhydrazine in the usual manner. The precipitated 2,4-dinitrophenylhydrazone was collected by filtration. It melted at 110–115° C. After purification by crystallization the melting point was increased to 114–115.5° C. This 2,4-dinitrophenylhydrazone was analyzed.

Anal. Calcd. for $C_{18}H_{22}O_{10}N_4$: C, 47.55; H, 4.89; N, 12.33. Found: C, 47.69; H, 4.86; N, 12.33.

Typical of the usefulness to which these aldehydes may be put is the production of alpha-hydroxypimelic acid, and the production of substituted hydantoin in accordance with the following reactions:

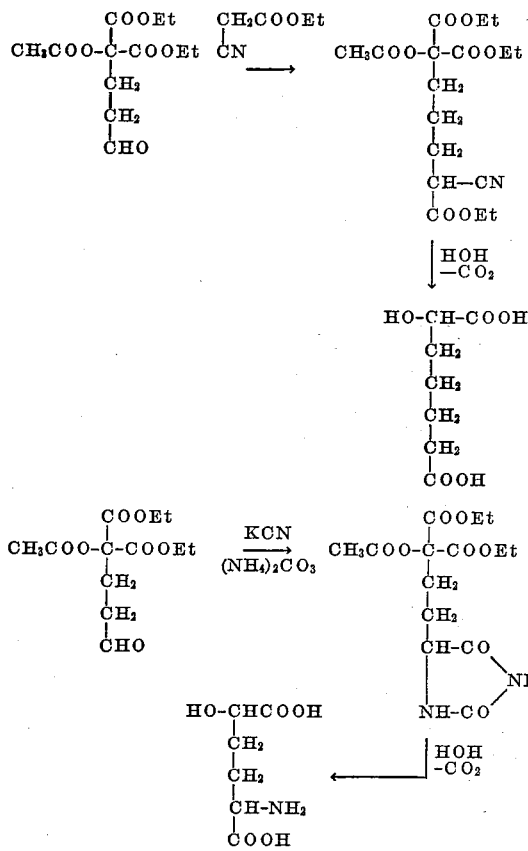

The simultaneous condensation-reduction reaction of acetoxy-gamma,gamma-dicarbethoxy-butyraldehyde with ethyl cyanoacetate was accomplished in the following manner:

An alcoholic solution of the aldehydo compound having a total volume of 77 cc. and containing approximately 0.1 mole of the aldehydo compound was mixed with 1.2 cc. of glacial acetic acid and 12.1 g. of ethyl cyanoacetate. The reaction mixture was cooled to 15° C. and 0.4 g. of piperidine was added. After the addition of 1.5 g. of 5% palladium on charcoal, the reduction was carried out at an initial pressure of 38 pounds. After the reduction was complete, the catalyst was removed by filtration and the light yellow filtrate was concentrated in vacuo. Two hundred cc. of benzene was used to dissolve the residue. The benzene solution was extracted with three 100 cc. portions of water. After drying over anhydrous sodium sulfate the benzene was distilled in vacuo and the residual oil was distilled under diminished pressure. The desired product was collected at 174–182° C./0.3–0.2 mm. The desired fraction was redistilled under diminished pressure, and the product collected at 160–168° C./0.1 mm. was submitted for analysis.

Anal. Calcd. for $C_{17}H_{25}O_8N$: C, 54.95; H, 6.79; N, 3.78. Found: C, 54.65; H, 6.66; N, 3.64.

This compound may be hydrolyzed and decarboxylated to alpha-hydroxypimelic acid in accordance with known procedures.

There are, of course, numerous other reactions which may be carried out with these particular compounds.

While various modifications of this invention have been described, it is to be understood that it is not limited thereto, but may be varied within the scope of the following claims.

We claim as our invention:

1. Aldehydo compounds having the following formula:

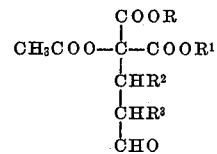

in which R and $R^1$ are low alkyl groups containing from one to four carbon atoms and in which $R^2$ and $R^3$ are selected from the group consisting of hydrogen and methyl.

2. Aldehydo compounds having the following formula:

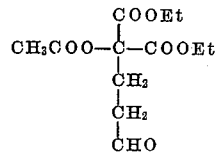

3. Aldehydo compounds having the following formula:

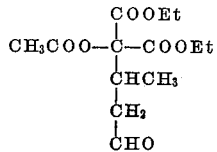

4. Aldehydo compounds having the following formula:

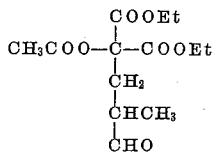

5. Process of producing aldehydes having the following formula:

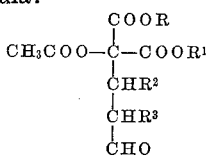

in which R and $R^1$ are low alkyl groups containing from one to four carbon atoms and in which $R^2$ and $R^3$ are selected from the group consisting of hydrogen and methyl, which comprises reacting an acetoxymalonic ester with an alpha,beta-unsaturated aldehyde having the following formula:

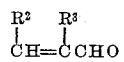

6. Process of producing gamma-acetoxy-gamma,gamma-dicarbethoxybutyraldehyde which comprises reacting ethyl acetoxymalonate with acrolein in the presence of an alkaline condensation catalyst.

7. Process of producing gamma-acetoxy-gamma,gamma-dicarbethoxy-alpha-methylbutyraldehyde which comprises reacting ethyl acetoxymalonate with methacrolein in the presence of an alkaline condensation catalyst.

8. Process of producing gamma-acetoxy-gamma,gamma-dicarbethoxy-beta-methylbutyraldehyde which comprises reacting ethyl acetoxymalonate with crotonaldehyde in the presence of an alkaline condensation catalyst.

DONALD T. WARNER.
OWEN A. MOE.

No references cited.